(12) United States Patent
Xue et al.

(10) Patent No.: US 12,044,531 B1
(45) Date of Patent: Jul. 23, 2024

(54) LEVEL INSTRUMENT AND METHOD FOR SURVEYING MINING SUBSIDENCE ZONE IN COAL MINING AREA

(71) Applicants: PING AN COAL MINING ENGINEERING TECHNOLOGY RESEARCH INSTITUTE CO., LTD, Huainan (CN); HUAINAN MINING (GROUP) CO., LTD, Huainan (CN)

(72) Inventors: Bo Xue, Huainan (CN); Shikai An, Huainan (CN); Yanfei Xu, Huainan (CN); Haiyan Cheng, Huainan (CN); Yanqing Li, Huainan (CN); Wei Miao, Huainan (CN); Derong Zhao, Huainan (CN); Hao Li, Huainan (CN); Hongxing Guo, Huainan (CN); Qingfa Liao, Huainan (CN)

(73) Assignee: PING AN COAL MINING ENGINEERING TEC, Huainan (CN)

( * ) Notice: Subject to any disclaimer, the term of this patent is extended or adjusted under 35 U.S.C. 154(b) by 0 days.

(21) Appl. No.: 18/633,522

(22) Filed: Apr. 12, 2024

Related U.S. Application Data

(63) Continuation of application No. PCT/CN2023/117987, filed on Sep. 11, 2023.

(30) Foreign Application Priority Data

Mar. 13, 2023 (CN) .......................... 202310253279.3

(51) Int. Cl.
*G01C 15/12* (2006.01)

(52) U.S. Cl.
CPC .................... *G01C 15/12* (2013.01)

(58) Field of Classification Search
CPC ...................................................... G01C 15/12
See application file for complete search history.

(56) References Cited

U.S. PATENT DOCUMENTS

| 6,249,983 B1 * | 6/2001 | Wright | F16M 11/14 33/290 |
| 6,804,892 B1 * | 10/2004 | Yung | G01C 15/004 33/286 |
| 8,826,550 B2 * | 9/2014 | Gnepf | G01C 19/38 33/290 |

FOREIGN PATENT DOCUMENTS

| CN | 108488587 A | 9/2018 |
| CN | 209557977 U | 10/2019 |
| CN | 210196896 U | 3/2020 |
| CN | 210219087 U | 3/2020 |

(Continued)

*Primary Examiner* — Yaritza Guadalupe-McCall

(57) ABSTRACT

A level instrument for surveying a mining subsidence zone in a coal mining area includes a bottom plate, a leveling mechanism, a lifting mechanism, and a level instrument body, where the leveling mechanism is provided on the bottom plate, the lifting mechanism is provided on the leveling mechanism, and the level instrument body is provided on the lifting mechanism. A surveying method using the level instrument is further provided. The level instrument is placed at a surveying location through the bottom plate, a levelness of the level instrument body is directly adjusted through the leveling mechanism below the level instrument body, and a height of the level instrument body is directly adjusted through the lifting mechanism. In this way, the operation process of the level instrument is simplified, and the overall surveying efficiency is improved.

16 Claims, 6 Drawing Sheets

(56) References Cited

FOREIGN PATENT DOCUMENTS

| | | | |
|---|---|---|---|
| CN | 217900828 U | | 11/2022 |
| CN | 219036024 U | * | 5/2023 |
| CN | 116358488 A | * | 6/2023 |
| CN | 116358488 A | | 6/2023 |
| CN | 219416175 U | | 7/2023 |
| CN | 219796606 U | * | 10/2023 |
| DE | 202006004049 U1 | | 6/2006 |

* cited by examiner

LEVEL INSTRUMENT AND METHOD FOR SURVEYING MINING SUBSIDENCE ZONE IN COAL MINING AREA

CROSS REFERENCE TO THE RELATED APPLICATIONS

This application is the continuation application of International Application No. PCT/CN2023/117987, filed on Sep. 11, 2023, which is based upon and claims priority to Chinese Patent Application No. 202310253279.3, filed on Mar. 13, 2023, the entire contents of which are incorporated herein by reference.

TECHNICAL FIELD

The present disclosure relates to the technical field of geologic survey, and in particular to a level instrument and method for surveying a mining subsidence zone in a coal mining area.

BACKGROUND

After underground coal mining, the original mechanical equilibrium state of the surrounding rock mass in the mining area is disrupted, causing the rock stratum to move, deform, and fail. When the mining area reaches a certain range, the movement and failure will affect the surface, causing deformation or damage to buildings, railways, rivers, and tunnels within the affected range of the mining operation. The discipline of mining subsidence aims to observe and study the laws of such movement and deformation and prevent the deformation and damage from bringing harmful effects to people's production or life. Once a coal mine subsides, the subsidence must be surveyed so as to formulate a control plan.

One of the widely used instruments for surveying the subsidence zone is a level instrument. The level instrument is designed to establish a horizontal line of sight and measure the altitude difference between two points on the ground. The use of the level instrument involves steps such as instrument placement, rough leveling, aiming with the leveling rod, precise leveling, and reading. The level instrument plays a crucial role in the surveying and construction industry due to its high accuracy, convenient use, fast speed, and reliability.

At present, the surveying work of mining subsidence zones in coal mining areas is usually carried out through a conventional level instrument, while the conventional level instrument needs to be supported by a tripod during use. After the conventional level instrument is placed, the length of each telescopic leg of the tripod is first adjusted to roughly level the support pedestal. Then, the level instrument body is precisely leveled to accurately measure the required data. However, due to the soft geological conditions and uneven ground in the mining subsidence zone, the placement of the level instrument is unstable and requires frequent rough leveling. The adjustment process makes the level instrument inconvenient to operate and time-consuming, seriously affecting the surveying progress.

Chinese utility model patent CN210196896U discloses a level instrument for surveying a mining subsidence zone in a coal mining area. The level instrument is provided with a circular support plate, which increases the contact area between one end of a support rod and the ground, improving the stability of the support rod. The level instrument avoids the problem that the tripod is tilted when the sharp bottom of the support rod is inserted into the soil, thereby improving the placement stability of the level instrument. However, the level instrument only improves the placement stability of the level instrument to a certain extent and avoids frequent adjustment, and it still does not solve the problem of long adjustment time.

SUMMARY

A technical problem to be solved by the present disclosure lies in the long adjustment time of the existing level instrument.

To solve the above technical problem, the present disclosure provides the following technical solutions.

A level instrument for surveying a mining subsidence zone in a coal mining area includes a bottom plate, a leveling mechanism, a lifting mechanism, and a level instrument body, where
  the leveling mechanism is provided on the bottom plate, the lifting mechanism is provided on the leveling mechanism, and the level instrument body is provided on the lifting mechanism; and
  the leveling mechanism is rotatable in a space to adjust a levelness of the lifting mechanism and the level instrument body, and the lifting mechanism is movable up and down to adjust a height of the level instrument body.

the present disclosure has the following advantages. According to the present disclosure, the level instrument is placed at the surveying location through the bottom plate, the levelness of the level instrument body is directly adjusted through the leveling mechanism below the level instrument body, and the height of the level instrument body is directly adjusted through the lifting mechanism. The present disclosure simplifies the operation process of the level instrument and improves the overall surveying efficiency.

Preferably, the leveling mechanism includes a screw rod, a threaded sleeve, a rotating disc, a spherical shell, and a groove;
  the screw rod is fixed to the bottom plate; the threaded sleeve is sleeved on the screw rod; and the rotating disc is provided on the threaded sleeve;
  the spherical shell is slidably provided on the rotating disc; and
  a lower end of the groove is provided with a sphere, and the sphere is fitted into the spherical shell.

Preferably, the rotating disc is provided with a plurality of fixed posts; and a bottom of the spherical shell is provided with a plurality of through holes; and
  the plurality of fixed posts are respectively fitted to the plurality of through holes in one-to-one correspondence, and the plurality of fixed posts have different heights.

Preferably, the groove is a square box structure; and parallel first sliding grooves are provided at bottoms of opposite sides inside the groove, respectively.

Preferably, the lifting mechanism includes a lifting bracket, a base plate, and a sliding base; and
  a lower end of the lifting bracket is slidably provided in the first sliding grooves, and the base plate is provided on an upper end of the lifting bracket through the sliding base.

Preferably, the lifting mechanism further includes a plurality of bottom clamping seats; and a lower end of the bottom clamping seat is slidably provided in the first sliding grooves, and an upper end of the bottom clamping seat is rotatably provided at the lower end of the lifting bracket.

Preferably, the base plate is a square plate; a bottom middle of the base plate is provided with a second sliding groove; and a lead screw is rotatably provided inside the second sliding groove.

Preferably, the lifting mechanism further includes a rotating handle; and the rotating handle is fixedly connected to the lead screw.

Preferably, the sliding base is provided with a horizontal beam, a driving element, and top clamping seats;
the horizontal beam is provided at a lower end of the base plate; the driving element is located at an upper middle of the horizontal beam and provided with a run-through threaded hole; and the driving element is sleeved on the lead screw through the threaded hole; and
the top clamping seats are provided at two bottom ends of the horizontal beam, respectively; and the top clamping seats are fixedly connected to the lifting bracket.

Preferably, a bottom of the bottom plate is provided with a plurality of ground nails, and the plurality of ground nails are evenly arranged.

The present disclosure further provides a surveying method, using the above-mentioned level instrument for surveying a mining subsidence zone in a coal mining area, and including the following steps:
S1: determining a leveling measurement location of the mining subsidence zone in the coal mining area, and inserting, by the ground nails, an overall structure into a ground of a placement location;
S2: observing, by an operator, a circular bubble level on the base plate, rotating the base plate such that the sphere rotates inside the spherical shell, and adjusting a levelness of the level instrument body;
S3: when the operator observes that a bubble of the circular bubble level is centered: rotating, by the operator, the threaded sleeve such that the threaded sleeve drives the rotating disc to move upwards, and the fixed posts at an upper end of the rotating disc move upwards along the through holes of the spherical shell until the fixed posts press against the sphere; and
S4: rotating, by the operator, the rotating handle to drive the lead screw to rotate; and driving, by the lead screw, the sliding bases at two ends to move towards a center, such that the lifting mechanism smoothly raises the base plate and the level instrument body, so as to raise the level instrument body to a suitable height and complete a surveying operation.

Compared with the prior art, the present disclosure has the following beneficial effects. According to the present disclosure, the level instrument is placed at the surveying location through the bottom plate, the levelness of the level instrument body is directly adjusted through the leveling mechanism below the level instrument body, and the height of the level instrument body is directly adjusted through the lifting mechanism. The present disclosure simplifies the operation process of the level instrument and improves the overall surveying efficiency.

Figure 1:
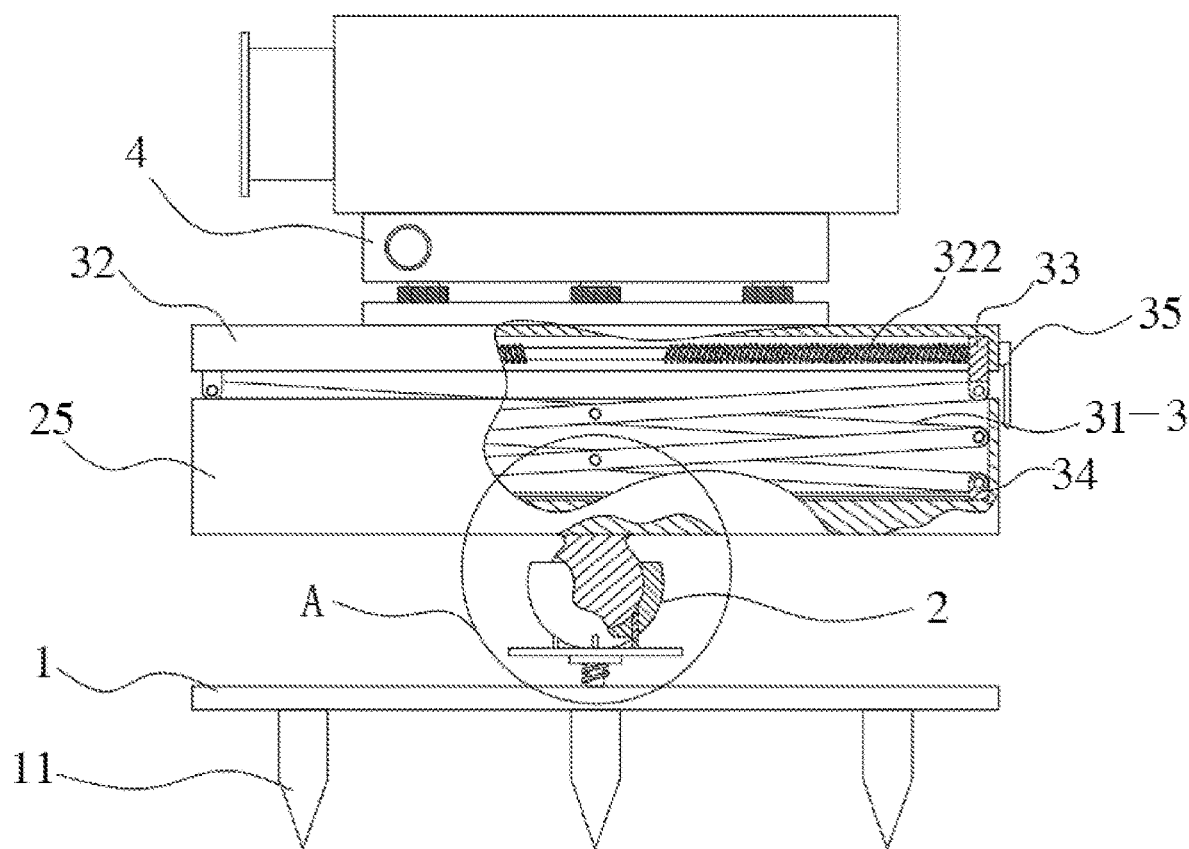
FIG. 1 is an overall structural diagram of a level instrument according to an embodiment of the present disclosure.

Reference Numerals: 1. bottom plate; 11. ground nail; 2. leveling mechanism; 21. screw rod; 22. threaded sleeve; 23. rotating disc; 231. fixed post; 24. spherical shell; 241. through hole; 25. groove; 251. sphere; 252. first sliding groove; 3. lifting mechanism; 31. lifting bracket; 32. base plate; 321. second sliding groove; 322. lead screw; 33. sliding base; 331. horizontal beam; 332. driving element; 333. top clamping seat; 34. bottom clamping seat; 341. clamping opening; 35. rotating handle; and 4. level instrument body.

DETAILED DESCRIPTION OF THE EMBODIMENTS

To help those skilled in the prior understand the technical solutions of the present disclosure, the technical solutions of the present disclosure are described in more detail below with reference to the drawings of the specification.

In addition, the terms such as "first" and "second" are used only for descriptive purposes, and should not be construed as indicating or implying relative importance or implying the number of indicated technical features. Thus, features defined with "first" and "second" may explicitly or implicitly include one or more of the features. In the description of the present application, "a plurality of" means two or more, unless otherwise specifically defined.

As shown in FIG. 1, this embodiment provides a level instrument for surveying a mining subsidence zone in a coal mining area, including bottom plate 1, leveling mechanism 2, lifting mechanism 3, and level instrument body 4.

In this embodiment, the bottom plate 1 is a square plate structure. A bottom of the bottom plate 1 is provided with a plurality of ground nails 11, and the plurality of ground nails 11 are evenly arranged. When in use, the ground nails 11 are inserted into a ground of a placement location of the level instrument to firmly fix the bottom plate 1 and improve the stability of the level instrument.

Figure 2:
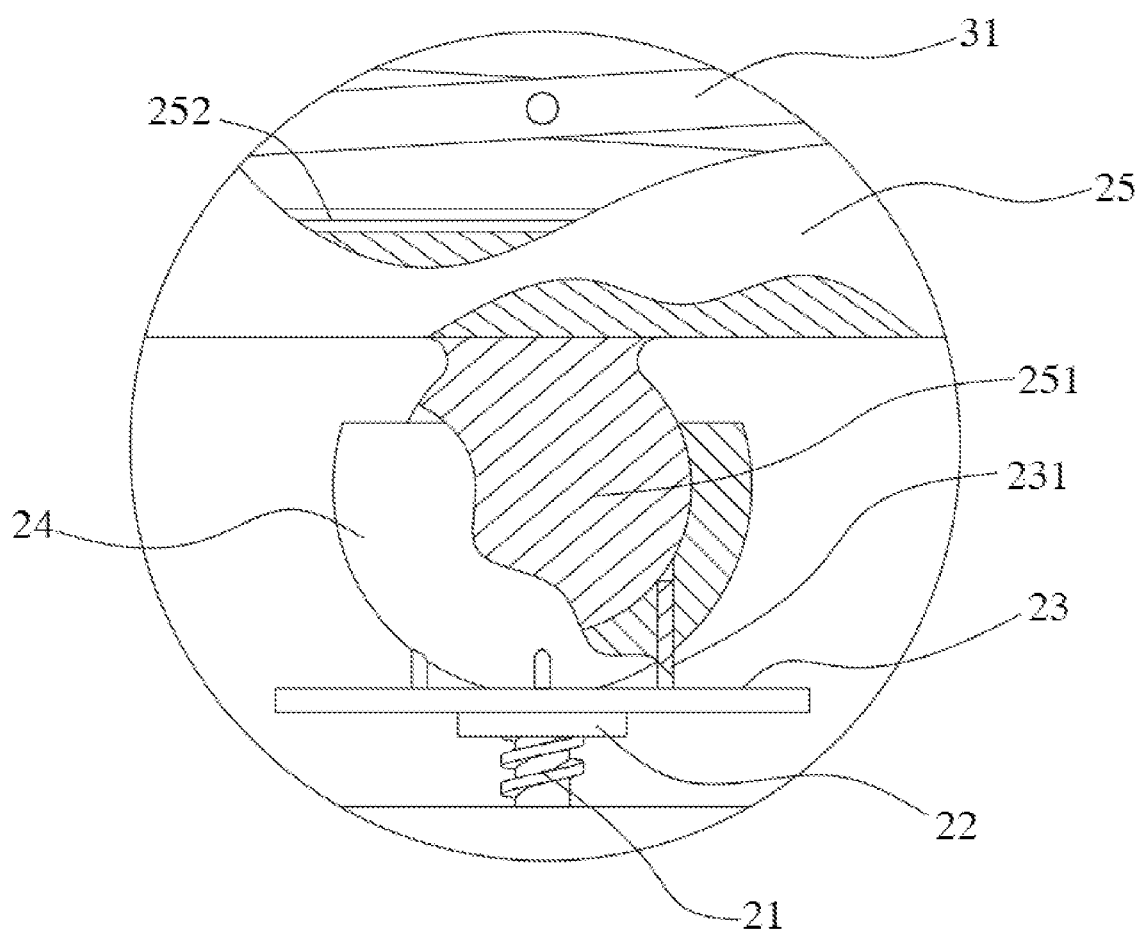
FIG. 2 is a partial enlarged view of the level instrument shown FIG. 1.

As shown in FIG. 2, the leveling mechanism 2 is provided on the bottom plate 1. The leveling mechanism 2 includes screw rod 21, threaded sleeve 22, rotating disc 23, spherical shell 24, and groove 25.

The screw rod 21 is vertically fixed to the bottom plate 1. A side wall of the screw rod 21 is provided with an external thread. The threaded sleeve 22 is provided with a run-through internal thread. The threaded sleeve 22 is fitted onto the screw rod 21 through a thread fitting method and is movable up and down. The rotating disc 23 is provided on the threaded sleeve 22. The rotating disc 23 is provided with a plurality of fixed posts 231. A bottom of the spherical shell 24 is provided with a plurality of through holes 241. The plurality of fixed posts 231 are respectively fitted to the plurality of through holes 241 in one-to-one correspondence. The plurality of fixed posts 231 have different heights and form a spherical structure through respective upper ends. A lower end of the groove 25 is provided with sphere 251, and the sphere 251 is fitted into the spherical shell 24. In this embodiment, the spherical structure formed by the plurality of fixed posts 231 has a same size as the sphere 251.

When the leveling mechanism 2 is used, the groove 25 rotates such that the sphere 251 rotates inside the spherical shell 24 to achieve rapid leveling. The threaded sleeve 22 rotates such that the threaded sleeve 22 moves upwards relative to the screw rod 21, thereby driving the rotating disc 23 to move upwards. In this way, the fixed posts 231 move upwards along the through holes 241 of the spherical shell 24 until tops of the fixed posts 231 press against the sphere 251. The design can further fix and position the gas, ensuring the horizontal state of the groove 25.

Figure 3:
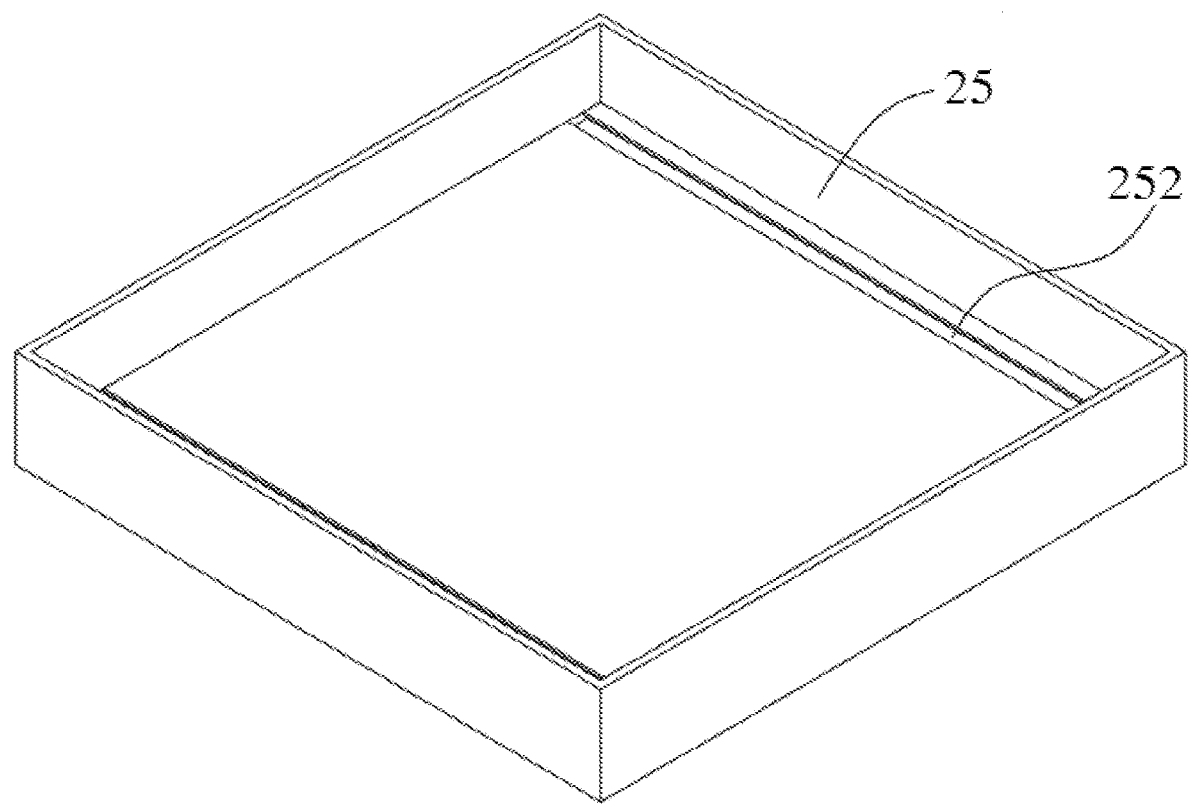
FIG. 3 is a front view of a groove according to an embodiment of the present disclosure.

As shown in FIG. 3, in this embodiment, the groove 25 is a square box structure with an opening at an upper end. Parallel first sliding grooves 252 are provided at bottoms of opposite sides inside the groove 25, respectively.

The lifting mechanism 3 is provided on the leveling mechanism 2, and the level instrument body 4 is provided on base plate 32.

The lifting mechanism 3 includes lifting bracket 31, the base plate 32, sliding base 33, and bottom clamping seat 34. In this embodiment, the lifting bracket 31 is a scissor lift that can be moved up and down.

Figure 4:
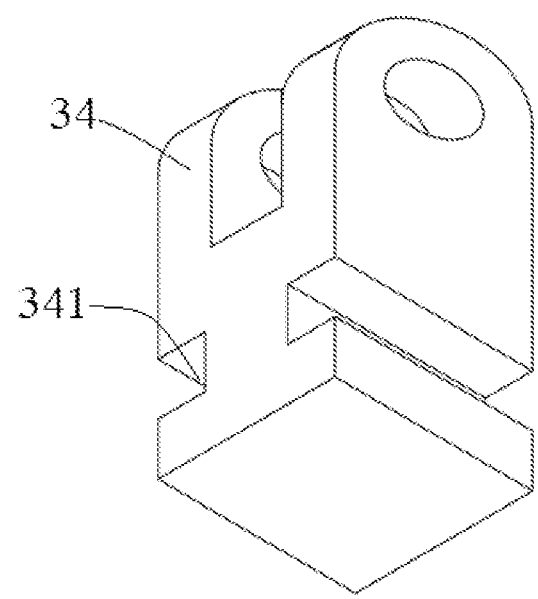
FIG. 4 is a structural diagram of a bottom clamping seat according to an embodiment of the present disclosure.

A lower end of the lifting bracket 31 is hinged to an upper end of the bottom clamping seat 34, and a lower end of the bottom clamping seat 34 is slidably provided in the first sliding grooves 252. Specifically, as shown in FIG. 4, the lower end of the bottom clamping seat 34 is provided with two "I-shaped" clamping openings 341, and the first sliding grooves 252 are rectangular structures. The two clamping openings 341 at the lower end of the bottom clamping seat 34 are matched with the first sliding grooves 252, allowing the bottom clamping seat to slide in the first sliding grooves 252.

Figure 5:
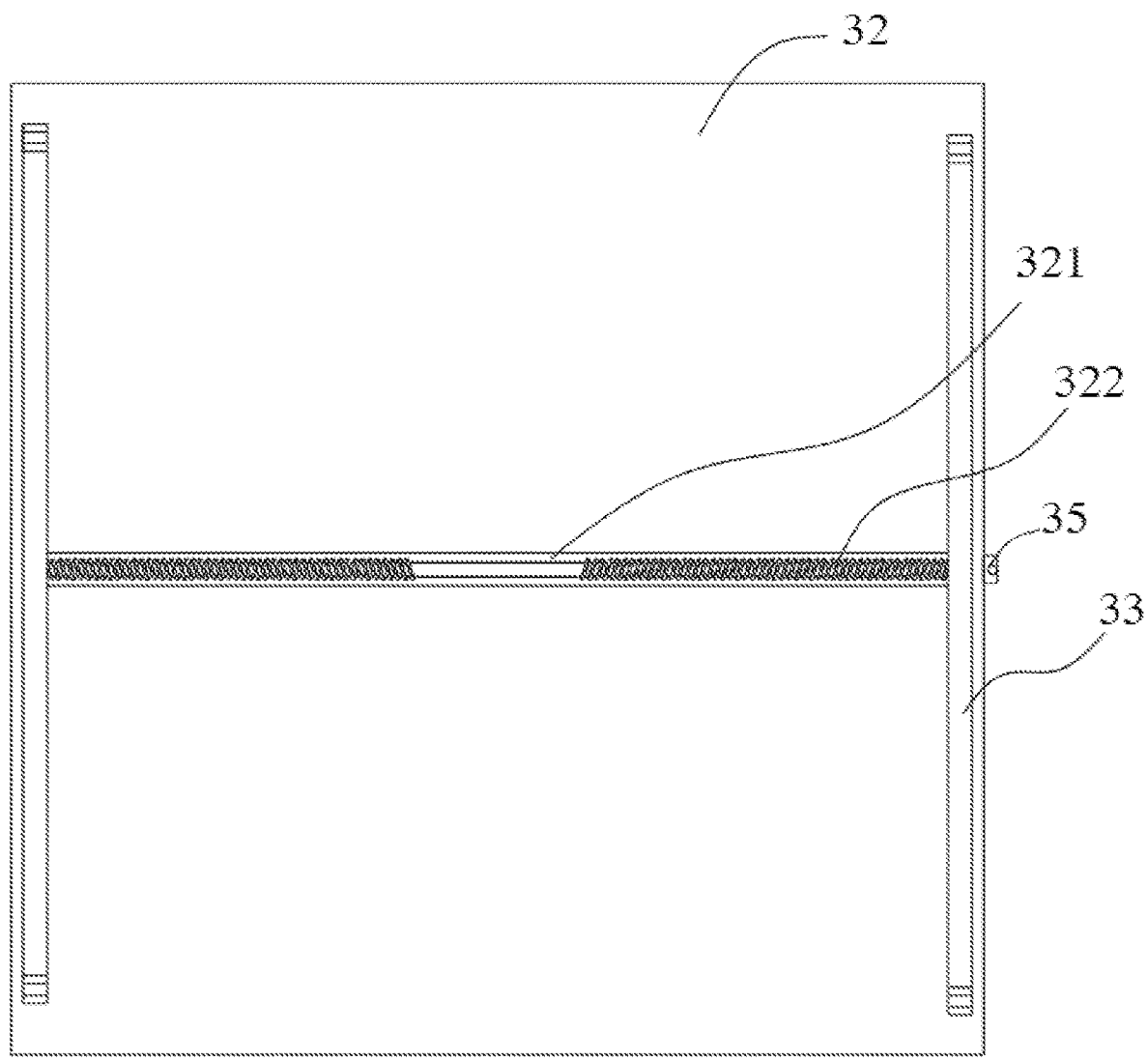
FIG. 5 is a bottom view of a base plate of a lifting mechanism according to an embodiment of the present disclosure.

As shown in FIG. 5, the base plate 32 is provided on an upper end of the lifting bracket 31 through the sliding base 33.

The base plate 32 is a square plate. A bottom middle of the base plate 32 is provided with second sliding groove 321, and lead screw 322 is rotatably provided inside the second sliding groove 321. In this embodiment, two sides of the lead screw 322 are provided with external threads with opposite rotation directions.

Figure 6:
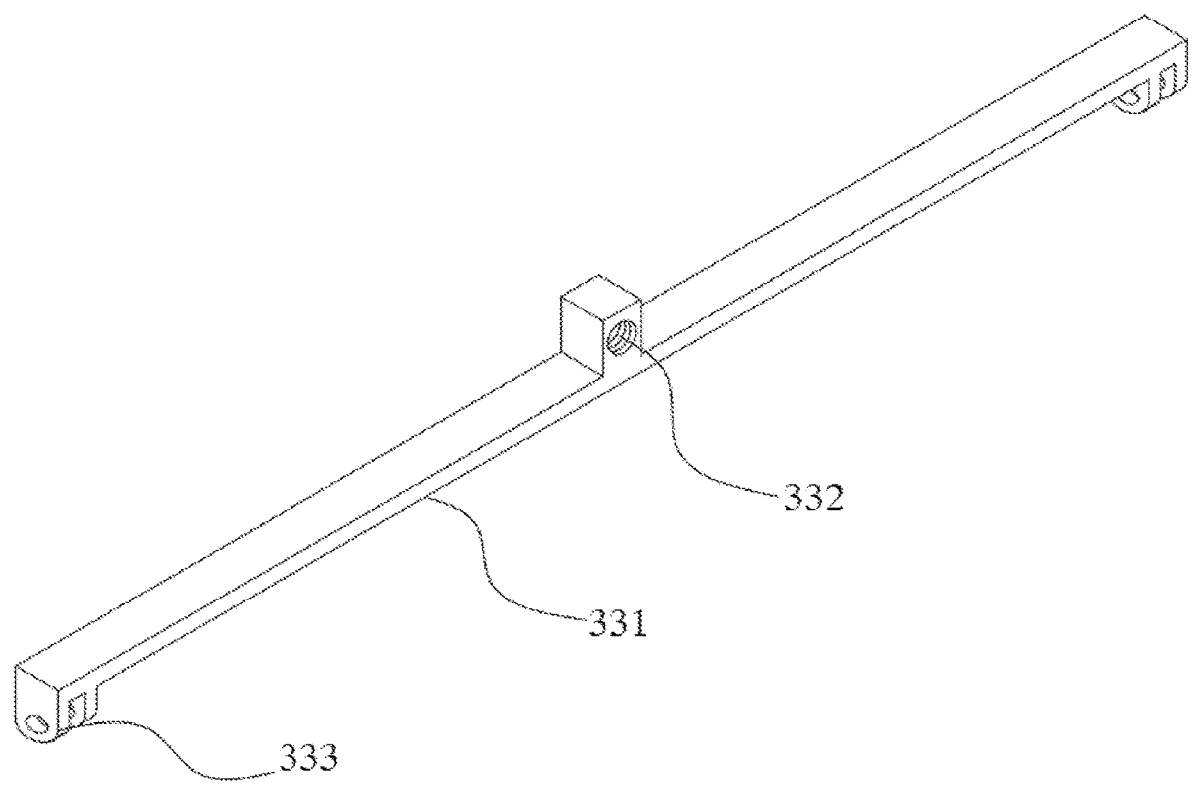
FIG. 6 is a structural diagram of a sliding base of the lifting mechanism according to an embodiment of the present disclosure.

As shown in FIG. 6, the sliding base 33 is provided with horizontal beam 331, driving element 332, and top clamping seats 333. The horizontal beam 331 is provided at a lower end of the base plate 32, and the driving element 332 is located at an upper middle of the horizontal beam 331. The driving element 332 is provided with a run-through threaded hole. The driving element 332 is sleeved at two ends of the lead screw 322 through the threaded hole. The top clamping seats 333 are provided at two bottom ends of the horizontal beam 331, respectively. The top clamping seats 333 are fixedly connected to the lifting bracket 31.

Specifically, there are two sliding bases 33 located at the two ends of the lead screw 322. When the lead screw 322 rotates, due to the opposite external threads at the two ends of the lead screw 322, the driving elements 332 located at the two ends of the lead screw 322 move close to or away from each other, thereby driving cross arms on two upper sides of the lifting bracket 31 to move close to or away from each other. When the cross arms on the two upper sides move close to each other, they drive the base plate 32 to move upwards. When the cross arms on the two upper sides move away from each other, they drive the base plate 32 to move downwards.

In some embodiments, the lifting mechanism 3 further includes rotating handle 35. The rotating handle 35 is provided on an outer side wall of the base plate 32. The rotating handle 35 is sleeved onto the lead screw 322 and fixed connected to the lead screw 322. An operator rotates the lead screw 322 by rotating the rotating handle 35.

The use process of the level instrument in this embodiment is as follows:

After a leveling measurement location of the mining subsidence zone in the coal mining area is determined, the ground nails 11 are inserted into the ground of a placement location. The operator observes a circular bubble level on a top surface of base plate 32 and rotates the base plate 32 such that the sphere 251 rotates inside the spherical shell 24, thereby quickly adjusting a levelness of the level instrument body 4.

When the operator observes that a bubble of the circular bubble level is centered, it is confirmed that the level instrument body 4 is leveled. The operator rotates the threaded sleeve 22 such that the threaded sleeve 22 drives the rotating disc 23 to move upwards. In this way, the fixed posts 231 at the upper end of the rotating disc 23 move upwards along the through holes 241 of the spherical shell 24 until the fixed posts 231 press against the sphere 251. The design achieves a horizontal state of the groove 25 and the base plate 32, further ensuring the levelness of the level instrument.

The operator rotates the rotating handle 35 to drive the lead screw 322 to rotate. The lead screw 322 drives the sliding bases 33 at two ends to move towards a center, causing the lifting mechanism 3 to smoothly lift the base plate 32 and the level instrument body 4, so as to raise the level instrument body 4 to a suitable height and complete a surveying operation.

The level instrument simplifies the operation process of surveying the subsidence zone, and improves the overall the efficiency of surveying.

It is apparent for those skilled in the art that the present disclosure is not limited to details of the above exemplary embodiments, and that the present disclosure may be implemented in other specific forms without departing from spirit or basic features of the present disclosure. Therefore, the embodiments should be regarded as exemplary and non-limiting in every respect. The scope of the present disclosure is defined by the appended claims rather than the above description, therefore, all changes falling within the meaning and scope of equivalent elements of the claims should be included in the present disclosure, and any reference numerals in the claims should not be construed as a limitation to the claims involved.

The above embodiments are merely intended to illustrate the implementations of the present disclosure, rather than to limit the protection scope of the present disclosure. Those skilled in the art can make various modifications and improvements to the technical solutions of the present disclosure without departing from the conception of the present disclosure, but such modifications and improvements should fall within the protection scope of the present disclosure.

The invention claimed is:

1. A level instrument for surveying a mining subsidence zone in a coal mining area, comprising a bottom plate, a leveling mechanism, a lifting mechanism, and a level instrument body, wherein
   the leveling mechanism is provided on the bottom plate, the lifting mechanism is provided on the leveling mechanism, and the level instrument body is provided on the lifting mechanism;
   the leveling mechanism is rotatable in a space to adjust a levelness of the lifting mechanism and the level instrument body, and the lifting mechanism is movable up and down to adjust a height of the level instrument body;

the leveling mechanism comprises a screw rod, a threaded sleeve, a rotating disc, a spherical shell, and a groove;

the screw rod is fixed to the bottom plate; the threaded sleeve is sleeved on the screw rod; and the rotating disc is provided on the threaded sleeve;

the spherical shell is slidably provided on the rotating disc; and a lower end of the groove is provided with a sphere, and the sphere is fitted into the spherical shell.

2. The level instrument for surveying the mining subsidence zone in the coal mining area according to claim 1, wherein the rotating disc is provided with a plurality of fixed posts; and a bottom of the spherical shell is provided with a plurality of through holes; and the plurality of fixed posts are respectively fitted to the plurality of through holes in one-to-one correspondence, and the plurality of fixed posts have different heights.

3. The level instrument for surveying the mining subsidence zone in the coal mining area according to claim 1, wherein the groove is a square box structure; and first sliding grooves are provided in parallel at bottoms of opposite sides inside the groove, respectively.

4. The level instrument for surveying the mining subsidence zone in the coal mining area according to claim 1, wherein the lifting mechanism comprises a lifting bracket, a base plate, and a sliding base; and a lower end of the lifting bracket is slidably provided in the first sliding grooves, and the base plate is provided on an upper end of the lifting bracket through the sliding base.

5. The level instrument for surveying the mining subsidence zone in the coal mining area according to claim 4, wherein the lifting mechanism further comprises a plurality of bottom clamping seats; and a lower end of each of the plurality of bottom clamping seats is slidably provided in the first sliding grooves, and an upper end of each of the plurality of bottom clamping seats is rotatably provided at the lower end of the lifting bracket.

6. The level instrument for surveying the mining subsidence zone in the coal mining area according to claim 4, wherein the base plate is a square plate; a bottom middle of the base plate is provided with a second sliding groove; and a lead screw is rotatably provided inside the second sliding groove.

7. The level instrument for surveying the mining subsidence zone in the coal mining area according to claim 6, wherein the sliding base is provided with a horizontal beam, a driving element, and top clamping seats;

the horizontal beam is provided at a lower end of the base plate; the driving element is located at an upper middle of the horizontal beam and provided with a run-through threaded hole; and the driving element is sleeved on the lead screw through the run-through threaded hole; and the top clamping seats are provided at two bottom ends of the horizontal beam, respectively; and the top clamping seats are fixedly connected to the lifting bracket.

8. The level instrument for surveying the mining subsidence zone in the coal mining area according to claim 1, wherein a bottom of the bottom plate is provided with a plurality of ground nails, and the plurality of ground nails are evenly arranged.

9. A surveying method, using the level instrument for surveying the mining subsidence zone in the coal mining area according to claim 1, and comprising the following steps:

S1: determining a leveling measurement location of the mining subsidence zone in the coal mining area, and inserting, by a plurality of ground nails, an overall structure into a ground of a placement location;

S2: observing, by an operator, a circular bubble level on a base plate, rotating the base plate such that the sphere rotates inside the spherical shell, and adjusting a levelness of the level instrument body;

S3: when the operator observes that a bubble of the circular bubble level is centered: rotating, by the operator, the threaded sleeve such that the threaded sleeve drives the rotating disc to move upwards, and a plurality of fixed posts at an upper end of the rotating disc move upwards along a plurality of through holes of the spherical shell until the plurality of fixed posts press against the sphere; and S4: rotating, by the operator, a rotating handle to drive a lead screw to rotate; and driving, by the lead screw, sliding bases at two ends to move towards a center, such that the lifting mechanism smoothly raises the base plate and the level instrument body, so as to raise the level instrument body to a suitable height and complete a surveying operation.

10. The surveying method according to claim 9, wherein in the level instrument, the rotating disc is provided with the plurality of fixed posts; and a bottom of the spherical shell is provided with the plurality of through holes; and the plurality of fixed posts are respectively fitted to the plurality of through holes in one-to-one correspondence, and the plurality of fixed posts have different heights.

11. The surveying method according to claim 9, wherein in the level instrument, the groove is a square box structure; and first sliding grooves are provided in parallel at bottoms of opposite sides inside the groove, respectively.

12. The surveying method according to claim 9, wherein in the level instrument, the lifting mechanism comprises a lifting bracket, the base plate, and the sliding bases; and a lower end of the lifting bracket is slidably provided in the first sliding grooves, and the base plate is provided on an upper end of the lifting bracket through the sliding bases.

13. The surveying method according to claim 12, wherein in the level instrument, the lifting mechanism further comprises a plurality of bottom clamping seats; and a lower end of each of the plurality of bottom clamping seats is slidably provided in the first sliding grooves, and an upper end of each of the plurality of bottom clamping seats is rotatably provided at the lower end of the lifting bracket.

14. The surveying method according to claim 12, wherein in the level instrument, the base plate is a square plate; a bottom middle of the base plate is provided with a second sliding groove; and the lead screw is rotatably provided inside the second sliding groove.

15. The surveying method according to claim 14, wherein in the level instrument, each of the sliding bases is provided with a horizontal beam, a driving element, and top clamping seats;

the horizontal beam is provided at a lower end of the base plate; the driving element is located at an upper middle of the horizontal beam and provided with a run-through threaded hole; and the driving element is sleeved on the lead screw through the run-through threaded hole; and the top clamping seats are provided at two bottom ends of the horizontal beam, respectively; and the top clamping seats are fixedly connected to the lifting bracket.

16. The surveying method according to claim 9, wherein in the level instrument, a bottom of the bottom plate is provided with the plurality of ground nails, and the plurality of ground nails are evenly arranged.

* * * * *